Oct. 25, 1960     L. L. ASPELIN     2,957,711
SHAFT SEAL FOR ALTERNATE WET AND DRY OPERATION
Filed April 12, 1957
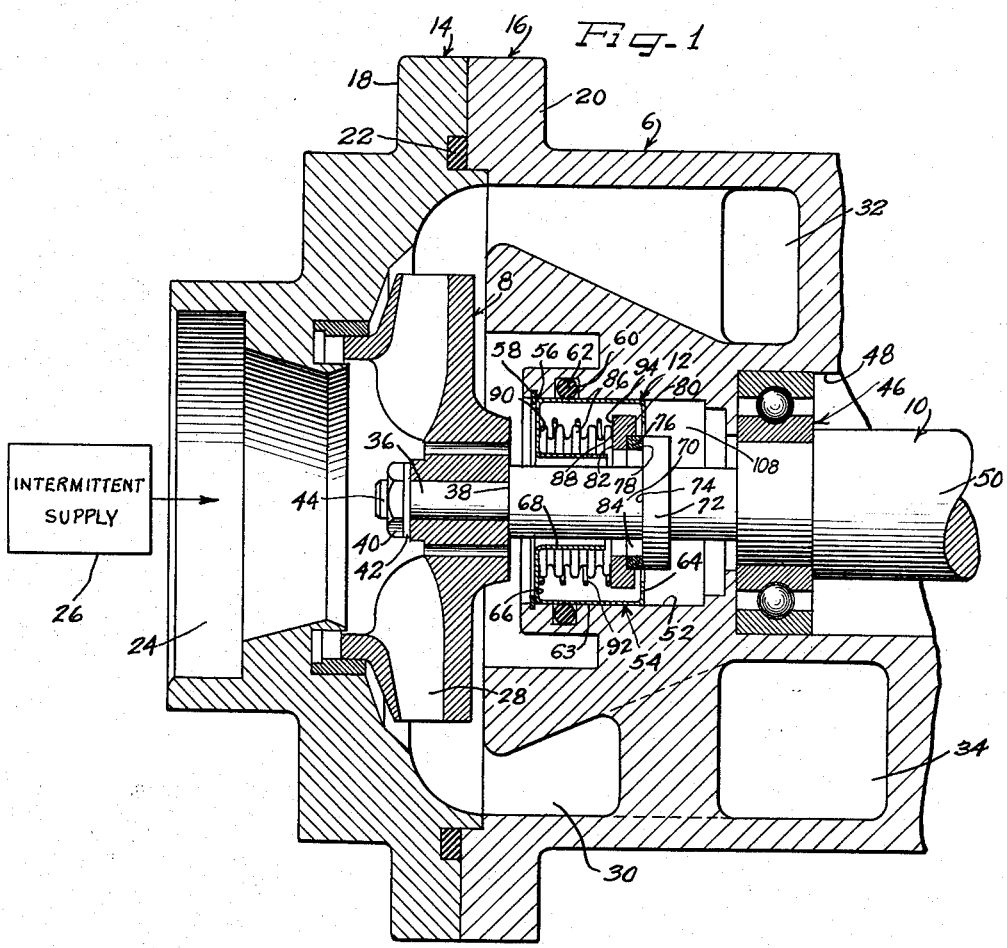
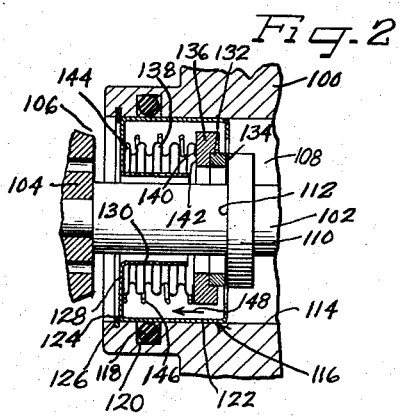
Inventor
LESLIE L. ASPELIN
by Hill, Sherman, Meroni, Gross & Simpson Attys.

United States Patent Office 2,957,711
Patented Oct. 25, 1960

2,957,711

SHAFT SEAL FOR ALTERNATE WET AND DRY OPERATION

Leslie L. Aspelin, Cleveland Heights, Ohio, assignor to Thompson Ramo Wooldridge Inc., Cleveland, Ohio, a corporation of Ohio Filed Apr. 12, 1957, Ser. No. 652,589

3 Claims. (Cl. 286—11)

The present invention relates to improvements in rotary seals for preventing the escape of fluid past the rotary shaft passing into a fluid pressure zone, and more specifically to an improved seal which will not burn up or become damaged with use with a continually rotating shaft which must operate in the intermittent absence of fluid and be able to run under dry conditions.

There are numerous mechanism utilizing a rotary shaft carrying a rotary seal to prevent the escape of fluid from a pressure zone into which the shaft passes. In such installations the fluid lubricates the seal and prevents it from becoming damaged and especially from burning up due to excess friction in the absence of fluid.

In some uses of a rotary shaft using a pressure seal there are periods where the pressurized fluid is not present. In the absence of fluid, the fluid lubrication for the seal is not present. In such installations it frequently becomes necessary to stop the rotation of the shaft in these dry periods solely to prevent damage to the seal.

Samples of installations utilizing rotary seals in the presence of an intermittent supply of fluid, are pumps in aircraft. It is not feasible or practical to provide the pump with automatic controls for stopping the pump each time fluid is not present and the seal is dry, and it is extremely impractical to require the pilot to manually terminate operation of the pump in the absence of the intermittent flow of fluid, since this would overburden the responsibilities of the pilot, and manual failure to stop the pump would result in damage to the seal. Further, it is expedient to have such intermittent flow pumps continually operating in order that they can be immediately pressed into service with a requirement for fluid flow.

Accordingly, it is a primary object of the invention to provide a rotary seal for a rotary shaft which prevents the escape of a flow of pressurized fluid past the seal, and wherein the fluid acts as a lubricant for the seal, and which will not burn out in the absence of fluid.

Another object of the invention is to provide a rotary fluid pressure seal for members having relative rotation wherein the relative rotation does not have to be stopped in the absence of fluid to prevent damage to the seal.

Another object of the invention is to provide a hydraulically unbalanced rotary fluid pressure seal wherein the sealing surfaces are brought together with a sealing force in the presence of a pressurized fluid which acts as a lubricant for the seal, and wherein the sealing pressure is positively and completely removed in the absence of the lubricating fluid.

A further object is to provide a rotary seal with cooperative sealing surfaces wherein means are provided to positively position the sealing surfaces together in mere touching, non-wearing contact when running dry.

Another object of the invention is to provide a rotary shaft seal employing an axially fixed sealing member with a smooth annular axially facing sealing surface and a movable sealing member with an axially facing smooth annular sealing surface, wherein the movable sealing member is hydraulically pressed into sealing engagement with the fixed sealing member with a flow of pressurized fluid and wherein a very lightweight biasing spring applies a relatively light pressure to the movable sealing member to hold it in mere touching contact with the fixed sealing member during a dry operation.

Another object of the invention is to provide a form of rotary seal for a continually rotating shaft employing hydraulically unbalanced sealing members with means provided to automatically separate the sealing surfaces in the absence of pressurized fluid when the seal must run dry.

A further object of the invention is to provide a rotary seal for a shaft such as utilized for driving a pump rotor provided with an intermittent flow of fluid wherein the seal must at times run dry, and wherein a pair of opposed sealing surfaces are employed and one of the surfaces is movable and its position is influenced by a lightweight biasing spring member which automatically moves the movable rotary sealing surface out of wearing contact with the other rotary sealing surface in the absence of pressurized fluid when the seal must run dry.

Other objects and advantages will become more apparent with the teachings of the principles of the invention in connection with the disclosure of the preferred embodiments in the specification, claims and drawings, in which:

Figure 1 is a sectional view taken along a plane parallel to the axis of the rotary shaft and seal; and Figure 2 is another sectional view similar to Figure 1, but showing an alternate form of the invention and with portions of the operating mechanism removed for simplifying the illustration.

As illustrated in the preferred embodiments of the drawings, the invention is shown employing the improved form of rotary seal in combination with a pump. It will be understood, however, that the application in the form of a pump is by way of illustration only, and the forms in which the seals are illustrated exemplify the preferred embodiments, but the principles of the invention may be utilized in other environments taking advantage of their inherent features.

Referring to Figure 1 of the drawings, a pump is shown enclosed in a casing or housing 6. The pump employs a rotor 8, which is driven by a rotary shaft 10, which carries the sealing mechanism shown generally at 12.

The pump housing which defines the pump chamber therein is formed of a first section 14 and a second section 16, which are provided with annular flanges 18 and 20 for securing the sections together. The flanges may be held together by bolts or the like, which are not shown, and a gasket 22 may be provided to hold the sections of the housing together in fluid tight relationship.

Fluid passes into the pump through a fluid inlet passageway 24 as it is supplied by an intermittent supply of fluid shown schematically at 26. The fluid is pressurized by the pump rotor 8, which includes the usual centrifugal passageways 28, which deliver the fluid to a pump pressure zone 30. The pressurized fluid flows through the pressure zone out through a pump discharge passageway shown at 32 and as continued at 34. The passageway 34 leads out of the pump housing 6 to a point of fluid delivery.

The rotor 8 is mounted on the inner end 36 of the pump drive shaft 10. An inner end 36 has a reduced portion defining a shoulder 38 against which the rotor is held by a nut 40 and a washer 42. The nut 40 is turned on to a threaded end 44 of the reduced end 36 of the drive shaft.

The drive shaft is rotatably supported within the housing on a ball bearing assembly 46, which is slid into a cylindrical recess 48 in the housing section 16, and which includes an inner and outer race with ball bearings therebetween.

A driven end 50 of the pump drive shaft 10 will extend outside of the housing 6 to a zone of lower pressure and will normally be exposed to atmosphere. The inner end 36 of the shaft will be in the high pressure zone of the pump and the rotary seal 12 is provided to prevent the escape of fluid from the pressure zone 30 of the pump past the bearing 46.

The rotary seal is accommodated by a cylindrical bore 52 in the section 16 of the pump housing 6 which will be exposed when the housing sections are separated. In assembly, a hollow, cylindrical, seal-carrying shell 54 will be inserted into the cylindrical bore 52. The seal-carrying shell will be locked in place by an expandible snap ring 56, which expands into an annular groove 58 in the cylindrical wall 52.

The cylindrical seal-receiving cavity 52 is provided with another groove 60, which receives an O-ring 62, and the O-ring seals the outer surface of the seal-carrying shell 54. The seal-carrying shell 54 has an outer cylindrical portion 63 with a shallow inwardly extending flange 64 on its lower end and an integral inwardly extending annular flange 66 on its upper end. The flange 66 on the upper end turns axially downwardly in a cylindrical flange 68, which is of smaller diameter than the outer wall portion 62 of the shell, and which is spaced from the shank portion 70 of the drive shaft.

The shank portion 70 of the drive shaft is located between the bearing 46 and the inner end 36 of the shaft. The shank portion carries a first axially fixed sealing member 72, which rotates with the shaft and may be integral therewith. This first rotary sealing member 72 is provided with a smooth axially facing annular sealing surface 74 which faces in the direction of the pressure zone 30 of the pump.

The fluid seal is completed by a second axially movable sealing member 76. This axially movable sealing member has an axially facing smooth annular sealing surface 78, which is adapted to be forced into sealing engagement with the sealing surface 74 of the axially fixed member. The second sealing member 76 is in the form of an annular ring and may be of carbon or the like, or of some material dissimilar to the first sealing member 72 for reducing the effects of wear therebetween.

The second axially movable sealing member 76 is supported on a carrier ring 80. The carrier ring has a pressure responsive surface 82, which is exposed to the pressure of the fluid within the pressure zone 30. Thus, when fluid is flowing through the pressure zone, the pressure will act on the surface 82 of the carrier ring 80, forcing the axially movable sealing ring 76 into sealing engagement with the fixed sealing ring 72. With the presence of pressurized fluid in the pressure zone, the fluid will be present in the area 84 of the seal and will lubricate the surfaces 74 and 78, which cooperatively mate to prevent the escape of fluid.

The carrier ring 80 is supported on a flexible wall member 86, which is shown in the form of a boot or bellows. The wall member, at its lower end 88 is attached to the carrier ring 80, and at its upper end 90, is attached to the inwardly extending annular flange 66 of the seal-carrying shell 54. Thus the boot 86 prevents the escape of fluid, but permits the axial movement of the second seal member 76.

The lower end 88 of the boot is connected to the carrier ring 80, so as to permit the surface 82 to be exposed to the fluid pressure in the pressure zone 30. When fluid stops flowing, this pressure will be relieved. The seal, comprised of the two sealing members 72 and 76 will then run dry in the absence of fluid. Although the pressure is relieved, the second sealing ring 76 is maintained in position to again be forced into sealing engagement with the new flow of fluid by the lightweight coil compression spring 92. This spring bottoms on the annular flange 66 of the seal-carrying shell 54 and on the outer surface 94 of the carrier ring 80. The spring 92 is very lightweight and exerts only a sufficient pressure to maintain the axially movable sealing ring 76 in mere touching engagement with the axially fixed ring 72. Therefore, the shaft 10 may continue its rotation during the dry run without the generation of heat and wear between the surfaces 74 and 78 of the mating sealing rings 72 and 76.

In the form of the seal shown in Figure 2, the housing is shown at 100 with the shaft 102 passing therethrough. The rotor 104 is carried at the inner end of the shaft and the pressure zone is shown at 106. The section of the housing 100 that is shown provides a wall separating the pressure zone 106 from the zone of reduced pressure 108.

As in the embodiment of Figure 1, the shaft 102 carries a first axially fixed sealing member 110. The sealing member is provided with a smooth annular sealing surface 112.

The housing 100 is provided with a cylindrical bore 114 and a seal-carrying shell 116 is inserted into the bore 114. An O-ring 118 is provided in the annular groove 120 in the bore opening 114 to seal the outer wall 122 of the shell 116. A locking ring 124 snaps outwardly into a groove 126 in the bore to hold the shell 116 in place.

The shell 116 is again provided with the inwardly extending annular flange 128, which is turned axially downwardly at 130.

A second movable seal member 132 is provided formed of carbon or other good wearing material and has a smooth annular sealing surface 134, which is pressed against the sealing surface 112 of the first sealing member.

The second sealing member 132 is mounted on a carrier ring 136, which is supported on the boot or bellows 138. The inner end 140 of the bellows is connected so as to provide a pressure responsive surface 142 on the carrier ring 136 exposed to the fluid pressure in the pressure zone 106. The upper end 144 of the bellows is secured to the flange 128 of the seal-carrying shell 116.

During the flow of fluid through the pressure zone 106, the movable sealing member 132 is held firmly in sealing engagement with the fixed sealing member 110. At the termination of the flow of fluid, when the seal runs dry, however, means are provided to automatically separate the sealing surfaces 112 and 134. This is provided by a coil tension spring 146, which exerts a pressure on the movable sealing ring and its carrier ring in the direction indicated by the arrow 148. Thus, as soon as the flow of pressurized fluid stops, removing the pressure from the surface 142 of the carrier ring 136, the spring 146 influences the position of the movable sealing ring 132 to separate the surfaces 134 and 112. Thus, the surfaces which, in the absence of pressurized fluid, have no lubricant, are separated preventing them from wearing or burning up.

Thus, it will be seen that I have provided improved forms of rotary seals suitable for use in applications wherein an intermittent supply of fluid must be accommodated, which meet the objectives and advantages hereinbefore set forth. The seals are simple and durable in construction, and require no attention.

The seals operate automatically during the operation of the mechanism, and function in a reliable manner to prevent accidental damage to the rotary seal. The seal permits the constant operation of the rotating shaft during intermittent fluid flow without requiring manual attention or automatic devices to temporarily interrupt operation of the shaft with the interruption of fluid flow.

I have, in the drawings and specification, presented a detailed disclosure of the preferred embodiments of my invention, but it is to be understood that I do not intend to limit the invention to the specific forms disclosed, but intend to cover all modifications, changes and alternative constructions and methods falling within the scope of the principles taught by my invention.

I claim as my invention:

1. A seal for a rotary shaft member passing through an opening in a wall member isolating a fluid pressure zone intermittently supplied with pressurized fluid, said seal operative to prevent the escape of fluid past the rotating shaft and preventing wear on the seal with the absence of pressurized fluid and comprising an axially fixed first sealing element mounted on one of said members and having an axially facing smooth annular sealing surface, a second movable sealing element having a smooth annular axially facing sealing surface adapted to be moved into sealing engagement with the surface of the first sealing element, a flexible wall secured to the other of said members and secured in sealed relationship to the movable sealing element and permitting axial movement thereof, a pressure responsive surface connected to the movable sealing element and exposed to the pressure zone whereby the fluid pressure will urge the movable sealing member into engagement with the fixed sealing member, and a light spring biasing means connected to the movable sealing member and exerting an urging force in a direction to separate the sealing members whereby in the absence of fluid pressure, the sealing members will separate to prevent wear between their sealing surfaces.

2. A seal for a rotary shaft in a housing of a pump or the like capable of sealing with intermittent fluid flow and isolating a pressure zone which is intermittently supplied with a pressurized fluid from a zone of lower pressure comprising in combination an axially fixed sealing member carried on the shaft and defining a smooth rotating annular sealing surface, an axially movable sealing member having an annular smooth axially facing sealing surface adapted for cooperative engagement with the sealing surface of the axially fixed member whereby the passage of a fluid from a high pressure zone on one side of said sealing surface to a zone of lower pressure is prevented, an expandable flexible bellows mounted on the housing surrounding the shaft and connected to the axially movable sealing member with the inside of the bellows communicating with said pressure zone, a very lightweight biasing coil compression loading spring positioned radially outside of the bellows protected from contact with fluids in the pressure zone for exerting a relatively light pressure on the axially movable sealing member and holding the axially movable sealing member in mere touching engagement with the sealing surface of the axially fixed sealing member whereby substantially no wear will occur between the surfaces in the absence of a pressure differential between pressure zones, and means exposing a surface of the axialy movable sealing member opposite its sealing surface to the zone of higher pressure whereby it will be forced against the fixed sealing member with a relatively large sealing force to hold the sealing members in positive sealing engagement when a pressure differential occurs.

3. A seal for a rotary member extending past a pressure restraining wall member and isolating a pressure zone which is supplied intermittently with a pressurized fluid which comprises an axially fixed sealing element having an axially facing smooth annular sealing surface, an axially movable sealing element having an axially facing smooth annular sealing surface for sealing engagement with the surface of the first element, said elements positioned between a rotary member and a fixed member, a flexible seal carrying member located to prevent passage of pressurized fluid and secured to the movable sealing element, a pressure responsive surface exposed to fluid pressure and connected to the movable sealing element whereby the sealing element may be forced into sealing engagement with the axially fixed sealing element with the existence of fluid pressure, and spring means for moving the movable sealing element out of wearing contact with the axially fixed sealing element with the absence of fluid pressure to prevent the sealing surfaces from wearing with the absence of fluid to lubricate the sealing surfaces.

References Cited in the file of this patent
UNITED STATES PATENTS

| | | |
|---|---|---|
| 2,382,960 | Compton et al. | Aug. 21, 1945 |
| 2,610,075 | Haake | Sept. 9, 1952 |
| 2,785,913 | Solari | Mar. 19, 1957 |